US006218459B1

(12) United States Patent
Gruning et al.

(10) Patent No.: US 6,218,459 B1
(45) Date of Patent: Apr. 17, 2001

(54) PIGMENT PASTES COMPRISING HYDROPHOBICALLY MODIFIED POLYASPARTIC ACID DERIVATIVES

(75) Inventors: Burghard Gruning; Stefan Silber; Jorg Simpelkamp; Christian Weitemeyer, all of Essen (DE)

(73) Assignee: Th. Goldschmidt AG, Essen (DE)

( * ) Notice: Subject to any disclaimer, the term of this patent is extended or adjusted under 35 U.S.C. 154(b) by 0 days.

(21) Appl. No.: 09/313,026

(22) Filed: May 17, 1999

(30) Foreign Application Priority Data

May 20, 1998 (DE) ............................................. 198 22 603

(51) Int. Cl.$^7$ ............................... C08J 3/03; C08K 3/04; C08G 69/10
(52) U.S. Cl. ......................... 524/538; 524/495; 524/497; 524/80; 524/81; 525/419; 525/420; 528/310; 528/328; 528/363
(58) Field of Search ..................................... 528/310, 328, 528/363; 525/419, 420; 524/538, 80, 81, 495, 497

(56) References Cited

U.S. PATENT DOCUMENTS

| 3,980,602 | 9/1976 | Jakubauskas . |
| 5,219,952 | 6/1993 | Koskan et al. . |
| 5,910,564 | * 6/1999 | Gruning et al. ...................... 528/310 |

FOREIGN PATENT DOCUMENTS

| 36 26 672 A1 | 2/1988 | (DE) . |
| 37 00 128 A1 | 7/1988 | (DE) . |
| 43 00 020 A1 | 7/1994 | (DE) . |
| 44 16 336 A1 | 11/1995 | (DE) . |
| 44 20 642 A1 | 12/1995 | (DE) . |
| 195 24 097 A1 | 1/1997 | (DE) . |
| 195 45 678 A1 | 6/1997 | (DE) . |
| 0 458 079 A2 | 11/1991 | (EP) . |
| 0 578 449 A1 | 1/1994 | (EP) . |
| 0 612 784 A1 | 8/1994 | (EP) . |
| 0 659 875 A2 | 6/1995 | (EP) . |
| 0 731 148 A2 | 9/1996 | (EP) . |
| WO 92/14753 | 9/1992 | (WO) . |
| WO 94/18260 | 8/1994 | (WO) . |
| WO 94/21701 | 9/1994 | (WO) . |

OTHER PUBLICATIONS

Kovaks, et al., "Synthesis and Inhibitory Activity of Polyaspartic Acid Derivatives," J. Med. Chem., vol. 10, pp. 904–907 (1967).
Neri, et al., "Synthesis of α, β–Poly [2–Hydroxyethyl)–D–L–Aspartamide], a New Plasma Expander," J. Med. Chem., vol. 16, No. 8, pp. 893–897 (1973).
Neri, et al., "α, β–Poly(2–Hydroxyethyl)–DL–Aspartamide," Macromol. Synth., vol. 8, pp. 25–29 (1982).
Neuse, et al., "Water–Soluble Polyamides as Potential Drug Carriers," Applied Macromolecular Chemistry and Physics, vol. 192, pp. 35–50 (1991).

* cited by examiner

*Primary Examiner*—Duc Truong
(74) *Attorney, Agent, or Firm*—Scully, Scott, Murphy & Presser

(57) ABSTRACT

The present invention relates to aqueous pigment pastes comprising hydrophobically modified polyaspartic acid derivatives as dispersants. The invention relates in particular to the use of hydrophobically modified polyaspartic acid derivatives as dispersants for preparing aqueous pigment pastes.

11 Claims, No Drawings

PIGMENT PASTES COMPRISING HYDROPHOBICALLY MODIFIED POLYASPARTIC ACID DERIVATIVES

BACKGROUND OF THE INVENTION

1. Field of the Invention

The present invention relates to aqueous pigment pastes comprising hydrophobically modified polyaspartic acid derivatives as dispersants. The present invention relates in particular to the use of hydrophobically modified polyaspartic acid derivatives as dispersants for preparing aqueous pigment pastes.

2. Prior Art

Pigment pastes for the purposes of the present invention embrace pastes of organic and/or inorganic pigments or fillers in aqueous media. In the preparation of paints and coating materials, wetting agents and dispersants make it easier to incorporate pigments and fillers, which are important formulation constituents as they determine significantly the visual appearance and the physicochemical properties of coatings. To best exploit their effects it is necessary, firstly, for these solids to be distributed uniformly in coating materials and paints and, secondly, for the distribution, once achieved, to be stabilized. Indeed, during the preparation and processing of aqueous pigment pastes, numerous problems may arise:
difficulties in incorporating the pigments
high viscosities of ink pastes, paints and coating materials
sedimentation
vertical migration of pigments (floating)
horizontal migration of pigments (flooding)
low degree of gloss
low hiding power
inadequate depth of color
poor reproducibility of shade
excessive tendency of coating materials to run There has therefore been no lack of attempts to provide effective dispersing additives for solids, especially pigments. Examples of dispersing additives which are described as being highly suitable for these purposes are water-soluble, polyisocyanate adducts containing hydrophilic polyether chains (see European Publication No. 0 731 148 A), hydrophilic polyurethane-polyureas (see German Publication No. 44 16 336 A), poly(meth)acrylates (see U.S. Pat. No. 3,980,602 and International Patent Publication No. WO 94/21701 A), and specific polyesters (see International Publication No. WO 94/18260 A).

However, the use of such products is also associated with a large number of disadvantages. For instance, high levels of added dispersing additives are often necessary; the levels of paste pigmentation which can be achieved are unsatisfactorily low; the stability of the pastes and thus the constancy of their viscosity is inadequate—flocculation and aggregation cannot always be avoided; in many cases, following a storage of the pastes, there is also a lack of constancy of shade and of compatibility with various binders. The use of known dispersing additives also in many cases has an adverse effect on the water resistance of coatings; moreover, the undesirable foam which forms during preparation and processing is additionally stabilized. A further criterion, whose importance has increased in recent times in particular, is the environmental compatibility of the additives.

It is an object of the present invention to overcome many of the abovementioned disadvantages and in so doing to exert a positive influence in particular on the viscosity and the development of tinctorial strength during the preparation of the pastes and their processing.

SUMMARY OF THE INVENTION

In accordance with the present invention the object is surprisingly achieved by means of one or more hydrophobically modified polyaspartic acid derivatives or their salts and customary auxiliaries and additives.

DETAILED DESCRIPTION OF THE INVENTION

Polyamino acid derivatives, especially polyaspartic acid, have received particular attention in recent times because of their properties. Proposed applications include biodegradable complexing agents, incrustation inhibitors, softeners, and laundry detergent builders. Polyaspartic acid is generally obtained by alkaline hydrolysis of the direct synthesis precursor polysuccinimide (PSI, anhydropolyaspartic acid), the cyclic amide of polyaspartic acid. PSI can be prepared, for example, in accordance with European Publication No. 0 578 449 A, International Publication No.WO 92/14753, European Publication No. 0 659 875 A or German Publication No. 44 20 642 A from aspartic acid or is obtainable, for example, in accordance with German Publication No. 36 26 672 A, European Publication No. 0 612 784 A, German Publication No. 43 00 020 A or U.S. Pat. No. 5,219,952 A from maleic acid derivatives and ammonia.

Reaction of polysuccinimide with amines, which has been described by various groups of workers, leads to polyaspartamides (Kovacs et al., J. Med. Chem. 1967, 10, 904–7; Neuse, Angew. Makromol. Chem. 1991, 192, 35–50). Neri et al. conduct the ring opening of PSI with ethanolamine and obtain hydroxyethylaspartamides (J. Med. Chem. 1973, 16, 893–897, Macromol. Synth. 1982, 8, 25–29). German Publication No. 37 00 128 A and European Publication No. 0 458 079 A describe the subsequent esterification of such hydroxyethyl derivatives with carboxylic acid derivatives and the use of the products in ultrasound contrast agents and in active substance depot formulations.

German Publication No. 195 24 097 Al describes products of esterification of polyaspartic acid with fatty alcohols. While, however, homogeneous reaction products prepared under the customary esterification conditions are difficult to prepare, copolymeric, hydrophobically modified polyaspartic esters based on maleic monoesters and ammonia or on polysuccinimide and alcohols are easy to obtain, as is evident from German Publication No. 195 45 678 or European Application No. 96 118 806.7.

In compounds of this kind, which can be deployed to advantage in wetting agents and dispersants, some of the side chains are in the form of free carboxylic acid or carboxylate groups and some are esterified with one or more alcohols of 1 to 18 carbon atoms, preferably of 8 to 12 carbon atoms, or derivatives thereof.

For example, copolymers derived from polyaspartic acid can be employed in which at least 75 mol % of the units consist of structural units of the general formulae (I) and (II) where A is a trifunctional hydrocarbon radical of 2 carbon atoms with the structure (A1) or (A2),

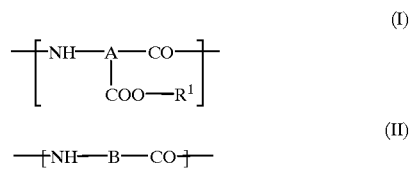

-continued

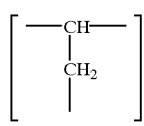
(A1)

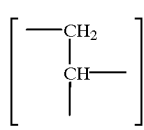
(A2)

in which $R^1$ has the definition of $R^2$, $R^3$ or $R^4$ where
$R^2$ is one or more radicals from the group consisting of alkali metals, alkaline earth metals, hydrogen and ammonium, $[NR^5R^6R^7R^8]^+$, where
$R^5$ to $R^8$ independently of one another are hydrogen, alkyl or alkenyl of 1 to 22 carbon atoms or hydroxyalkyl of 1 to 22 carbon atoms and 1 to 6 hydroxyl groups,
$R^3$ is identical or different, straight-chain or branched, saturated or unsaturated alkyl or alkenyl radicals $R^9$ of 6 to 30 carbon atoms or is radicals of the structure —X—$R^9$, where X is an oligooxyalkylene or polyoxyalkylene chain of 1 to 100 oxyalkylene units, and
$R^4$ is identical or different, straight-chain or branched, saturated or unsaturated alkyl or alkenyl radicals of 1 to 5 carbon atoms
and at least one radical $R^1$ must adopt the definition of $R^2$ and at least one radical $R^1$ must adopt that of $R^3$ or $R^4$ and
the units of the general formula (II) are proteinogenic or nonproteinogenic amino acids and are present in a proportion of not more than 20% by weight based on the copolymeric polyaspartic acid derivatives.

With particular preference $R^1$ has the definition of $R^3$.

The remaining units, which do not have the structure (I) or (II) (not more than 25 mol % of all units), may inter alia be iminodisuccinate units of the general formula (III)

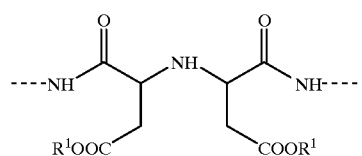
(III)

and also various end groups: at the N end, for example, aspartic acid, maleic acid, fumaric acid and malic acid units and their esters or amides, maleimide units or diketopiperazines derived from aspartic acid and/or the amino acid units (II), and also esters or amides of the amino acid units (II), and at the C end, for example, aspartic or malic acid units, their monoesters or diesters, amides or cyclic imides.

All of the information given regarding the composition of the polymeric products relates as usual to the average composition of the polymer chains.

Examples of suitable amino acid units (II) from the group of proteinogenic amino acids are glutamine, asparagine, lysine, alanine, glycine, tyrosine, tryptophan, serine and cysteine and their derivatives; examples of possible nonproteinogenic amino acids are (-alanine and (-amino-1-alkanoic acids, such as 6-aminocaproic acid, etc.

The invention prefers compounds in which there is at least one free carboxylate group ($R^1$=H, metal, ammonium, alkylammonium), at least one radical $R^3$ embraces identical or different radicals of the structure $R^9$—X— where $R^9$ comes from the group consisting of straight-chain or branched, saturated or unsaturated alkyl or alkenyl radicals of 6 to 18 carbon atoms (for example, branched or linear octyl-, decyl-, dodecyl-, tetradecyl-, hexadecyl- and octadecyl-, and also monounsaturated and polyunsaturated species such as oleyl) and X is a polyoxyalkylene chain of 0 to 100 alkylene glycol units, preferably derived from ethylene oxide, propylene oxide or mixtures thereof, and, if desired, one radical $R^4$ comes from the group of straight-chain or branched, saturated or unsaturated alkyl or alkenyl radicals of 1 to 5 carbon atoms (for example, methyl, ethyl, n-propyl, isopropyl, n-butyl, isobutyl, s-butyl, n-pentyl). One particularly preferred form of the copolymers comprises alkyl or alkenyl radicals $R^9$ of 8 to 12 carbon atoms without alkylene glycol spacers (alkylene glycol chain length 0), radicals $R^1$ which are hydrogen and/or come from the group of alkylammonium ions derived, for example, from mono-, di- or triethanolamine, dimethylethanolamine or 2-amino-2-methylpropanol, and also, if desired, small amounts of alkyl or alkenyl radicals of 1 to 4 carbon atoms.

The invention also employs, for example, derivatives which comprise free carboxylate groups ($R^1$=H, metal, ammonium, alkylammonium) and also radicals $R^4$ of 3 or 4 carbon atoms, such as n-propyl, isopropyl and the isomeric butyl radicals, and no radicals of the type $R^9$ or $R^9$—X— as defined above.

Derivatives of this kind are obtainable, for example, by the preparation process described in German Application No. 195 45 678 or European Application No. 96-118 806.7 from monoesters of monoethylenically unsaturated dicarboxylic acids—for example, maleic monoesters and ammonia—with or without subsequent neutralization.

The preparation can be conducted with or without the addition of organic solvents. Examples of suitable solvents are alcohols, ketones, esters, oligo- and poly(alkylene) glycols and their ethers, dimethyl sulfoxide, dimethylformamide, N,N-dimethylacetamide and N-methylpyrrolidone and mixtures thereof, etcetera. It is preferred to employ alcohols of 2 to 4 carbon atoms and also ketones such as methyl isobutyl ketone or methyl isoamyl ketone, for example, or alkyl esters of carboxylic acids of 1 to 4 carbon atoms, such as sec-butyl acetate or pentyl acetate, for example. The reaction can be conducted if desired in the presence of compatibilizers. These can be surface-active compounds, examples being adducts of from 1 to 30 mol of ethylene oxide and/or from 0 to 5 mol of propylene oxide with $C_{12}$–$C_{30}$ fatty alcohols and wool wax alcohols; ethylene oxide adducts of glyceryl monoesters and diesters and sorbityl monoesters and diesters of saturated and unsaturated fatty acids of 6 to 22 carbon atoms; adducts of from 2 to 30 mol of ethylene oxide and/or from 0 to 5 mol of propylene oxide with fatty acids of 12 to 22 carbon atoms and with alkylphenols of 8 to 15 carbon atoms in the alkyl group; $C_{12}$–$C_{18}$ fatty acid partial esters of adducts of from 1 to 30 mol of ethylene oxide with glycerol; adducts of ethylene oxide with fats and oils such as castor oil or hydrogenated castor oil; partial esters of saturated or unsaturated $C_{12}$–$C_{22}$ fatty acids, including branched or hydroxy-substituted acids, with polyols, examples being esters of glycerol, ethylene glycol, polyalkylene glycols, pentaerythritol, polyglycerol, sugar alcohols such as sorbitol and polyglucosides such as cellulose; polysiloxane-polyalkyl-polyether copolymers and their derivatives, and also hydrophobically modified polyaspartic acid derivatives, examples being partially esterified polyaspartic acids, partially esterified polyaspartic acid-co-glutamic acids, or condensates of maleic monoesters and ammonia, prepared for example by the process of the invention or in accordance with DE 195 45 678 A, in which context the preparation process of said polyamino acid derivatives has no influence on their compatibilizing effect. If desired, some of the product mixture can remain in the reactor and be used as solubilizer for a subsequent reaction.

Further possible compatibilizers and/or solubilizers are cationic surfactants from the group, for example, of the quaternary ammonium compounds, quaternized protein hydrolysates, alkylamidoamines, quaternary ester compounds, quaternary silicone oils or quaternary sugar derivatives and quaternary polysaccharide derivatives, anionic surfactants from the group, for example, of the sulfates, sulfonates, carboxylates and mixtures thereof, examples being alkylbenzenesulfonates, α-olefinsulfonates, α-sulfonated fatty acid esters, fatty acid glyceryl ester sulfates, paraffinsulfonates, alkyl sulfates, alkyl polyether sulfates, alkyl sulfosuccinates, fatty acid salts (soaps), fatty acid esters of polylactic acid, N-acylamino acid esters, N-acyltaurates, acylisethionates, ether carboxylates, monoalkyl phosphates, N-acylamino acid derivatives such as N-acylaspartates or N-acylglutamates, N-acylsarcosinates, amphoteric or zwitterionic surfactants such as, for example, alkylbetaines, a alkylamidoalkylbetaines of the type cocoamido-propylbetaine, sulfobetaines, phosphobetaines, sultaines and amidosultaines, imidazolinium derivatives, amphoglycinates, or nonionic surfactants such as, for example, ethoxylated fatty alcohols, ethoxylated alkylphenols, ethoxylated fatty acid esters, ethoxylated mono-, di- or triglycerides or polyalkylene glycol fatty acid esters, sugar esters, such as fatty acid esters of sucrose, fructose or methyl glucoside, sorbitol fatty acid esters and sorbitan fatty acid esters (ethoxylated or otherwise), alkyl or alkenyl polyglucosides and their ethoxylates, fatty acid N-alkylpolyhydroxyalkyl amides, polyglyceryl esters, fatty acid alkanolamides, long-chain tertiary amine oxides or phosphine oxides, and also dialkyl sulfoxides.

The compatibilizers preferably remain in the product. The reaction to form the copolymer takes place with aqueous or gaseous ammonia at temperatures from 20 to 150° C. followed by treatment at from 70 to 220° C., preferably from 100 to 140° C., under reduced pressure in, for example, kneading apparatus, high-viscosity reactors, extruders or stirred reactors, with or without the use of high-shear stirrers such as Mig or Intermig stirrers.

It is also possible to employ products of reaction of polyaspartic acid or polysuccinimide with long-chain alcohols, or the products of reaction of polyaspartic acid or polysuccinimide with short-chain alcohols of, for instance, 1 to 5 carbon atoms, following transesterification with long-chain alcohols of 6 to 30 carbon atoms, with or without concluding hydrolysis using, for example, alkali metal hydroxides or ammonium hydroxides. Derivatives of this kind are described in German Publication No. 195 45 678 A or European Application No. 96 118 806.7, or else in German Publication No. 195 24 097 A1.

It is also possible to employ copolymeric polyaspartic acid derivatives consisting of aspartic acid units with free carboxylic acid or carboxylate side chains, of N-hydroxyalkyl-substituted aspartamide units and their acylation products with long-chain carboxylic acid derivatives, and, if desired, of remaining polysuccinimide units. Such compounds are obtainable by hydrolysis - alkaline hydrolysis, for example—of the copolymeric polysuccinimide derivatives described in European Publication No. 0 458 079 A.

The polymers employed can be aftertreated by, for example, treating them with active carbon or other adsorbents, or bleaching them with oxidizing agents such as $H_2O_2$, $Cl_2$, $O_3$, sodium chlorite, sodium hypochlorite, etc., or reducing agents such as, for example, $NaBH_4$ or $H_2$ its in the presence of catalysts.

The present invention therefore provides for the use of hydrophobically modified polyaspartic acid derivatives of the formula below as dispersants for preparing aqueous pigment pastes. The formula shows the idealized linkage in position α although the products may at least in part also be present in β-linkage. Examples of typical average compositions of suitable hydrophobically modified polyaspartic acid derivatives are:

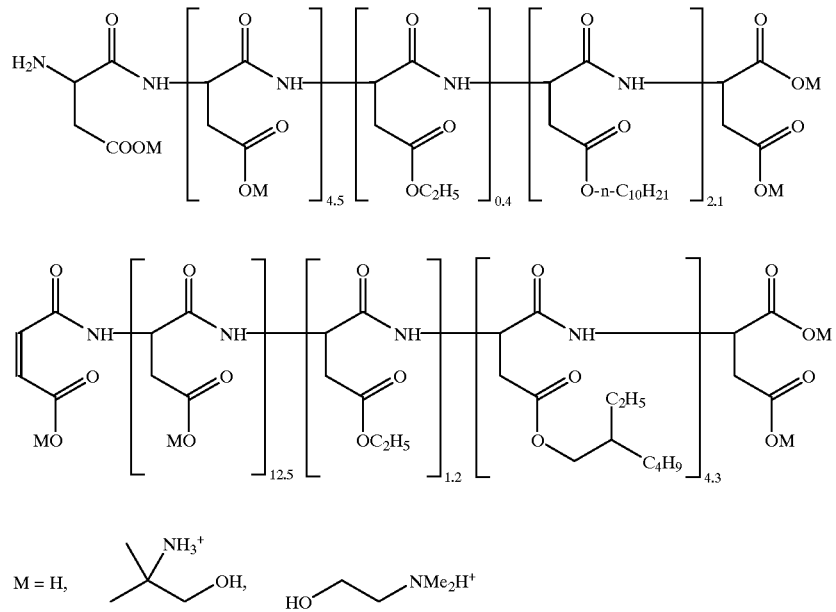

The hydrophobically modified polyaspartic acid derivatives of the invention, if not already present in salt form, are advantageously neutralized with prior art neutralizing agents, examples being alkali metal hydroxides, ammonium hydroxides, tetraalkylammonium hydroxides and amines. Particular preference is given here to the use of dimethylethanolamine or 2-amino-2-methylpropanol. Aqueous pigment pastes are prepared using from 0.1 to 100% by weight, preferably from 0.5 to 50% by weight and, in particular, from 2 to 15% by weight based on the weight of the pigments. In the context of their use in accordance with the invention the hydrophobically modified polyaspartic acid derivatives can either be mixed beforehand with the pigments that are to be dispersed or can be dissolved directly in the dispersion medium (water, with or without added glycol) prior to or simultaneously with the addition of the pigments and any other solids. Neutralization can be effected before or during the preparation of the pigment pastes. It is preferred to use polyaspartic acid formulations which have already been partially or fully neutralized.

The polyaspartic acid derivatives of the invention can also be employed in any desired mixtures with other, prior art dispersing additives, examples being those from the group consisting of fatty acid alkoxylates, poly(meth)acrylates, polyesters and polyethers etc.

Examples of suitable pigments in this context are organic or inorganic pigments and also carbon blacks. As inorganic pigments mention may be made, by way of example, of titanium dioxide and iron oxides. Examples of suitable organic pigments are azo pigments, metal complex pigments, phthalocyanine pigments, anthraquinonoid pigments, polycyclic pigments, especially those of the thioindigo, quinacridone, dioxazine, pyrrolopyrrole, naphthalenetetracarboxylic acid, perylene, isoamidoline or isoamidolinone, flavanthrone, pyranthrone or isoviolanthrone series.

Fillers, which can be dispersed, for example, in aqueous coating materials, are those based on kaolin, talc, other silicates, chalk, glass fibers, glass beads or metal powders, for example.

Coating systems in which the pigment pastes of the invention can be dispersed are suitably any aqueous 1- or 2-component coating materials. Examples which may be mentioned include aqueous 1-component coating materials such as those based on alkyd, acrylate, epoxy, polyvinyl acetate, polyester or polyurethane resins or aqueous 2-component coating materials such as those based on hydroxyl-containing polyacrylate or polyester resins with melamine resins or blocked or nonblocked polyisocyanate resins as crosslinkers. In the same way mention may also be made of polyepoxy resin systems.

PREPARATION EXAMPLES

Examples 1 to 3

Poly(aspartic acid-co-alkyl aspartate)

The polyaspartic esters were prepared in a manner similar to that of DE 195 45 678 A by reacting the precursors (monoethyl maleate, monoalkyl maleate) in methyl isobutyl ketone with from 1.0 to 1.5 equivalents of ammonia gas and then distilling the reaction mixture in vacuo at from 110 to 140° C. for from 4 to 6 h.

| Example | Alkyl radical | Precursor: mol of alkyl maleate | Precursor: mol of ethyl maleate | Product: mol % alkyl ester | Product: mol % ethyl ester | mol % acid |
|---|---|---|---|---|---|---|
| 1 | dodecyl | 0.8 | 3.2 | 18 | 9 | 73 |
| 2 | cetyl | 1.5 | 2.5 | 35 | 4 | 61 |
| 3 | decyl | 1.0 | 3.0 | 20 | 7 | 73 |

Examples 4 to 6

Performance Examples

To check the effectiveness of the dispersants of the invention, pigment pastes were prepared. To prepare the pigment pastes the dispersing additives were initially dissolved 40% strength in water, the pH was adjusted to 8.0 with 2-amino-2-methylpropanol, the resultant solutions were mixed with water and if appropriate, antifoams and then the pigments were added. Dispersion took place after adding grinding media (glass beads, 2 to 3 mm in diameter, same volume as the pigment paste) for one (titanium dioxide) or two (other pigments) hours in a Scandex shaker with air cooling.

Formulation of the white pastes

The white pastes were formulated as follows (amounts in % by weight):

| | (amounts in % by weight): |
|---|---|
| Formulation of the white pastes | |
| The white pastes were formulated as follows | |
| water | 16.4% |
| dispersing additive of the invention (Example 1) 40% strength | 12.3% |
| antifoam (e.g., Surfynol ® 104, from Air Products) | 1.0% |
| titanium dioxide 2160 (Kronos) | 70.0% |
| Aerosil ® A200 (Degussa) | 0.3% |
| Formulation of the black pastes | |
| The black pastes were formulated as follows | |
| water | 60.3% |
| dispersing additive of the invention; (Example 1) 40% strength | 22.3% |
| antifoam (e.g., Surfynol ® 104, from Air Products) | 1.0% |
| 2-amino-2-methylpropanol (Angus) | 1.4% |
| gas black FW 200 (Degussa) | 15.0% |
| Formulation of a dispersion clearcoat | 97.0% |
| acrylate dispersion NeoCryl ® XK90 (Zeneca) Texanol( | 3.0% |

To prepare gray pigmented paints 40.0 g of clearcoat were introduced initially, 14.2 g of white paste and 2.65 g of black paste were added, and the mixture was homogenized on a dissolver at 1500 rpm for 5 minutes. The samples were knife coated onto sheet aluminum in a wet film thickness of 100 μm and dried at room temperature.

Test of paste stabilities

To determine the paste stabilities, the achieveable initial viscosities and viscosities following storage at 25° C. and 50° C. for four weeks were measured at two different shear rates (20 l/s and 1000 l/s). All of the white and black pastes of the invention were characterized by only a slight rise in viscosity, thereby demonstrating the good stability of the pigment pastes of the invention.

Test of dispersing properties

After drawing down the test formulations in a wet film thickness of 100 μm and drying them for 6 minutes, a rubout test was conducted on ⅓ of the area. After overnight drying the drawdowns were subjected to calorimetric measurement using an XP68 spectrophotometer from X-Rite. Degree of gloss and haze were determined using a Haze-Gloss instrument from Byk-Gardner.

| | Emulsion paint based on NeoCryl ® XK90 | | | | |
|---|---|---|---|---|---|
| Example | Sample | Lightness L | E after rubout | Gloss (60° angle) | Haze |
| 4 | 1 | 47.5 | 0.3 | 41.0 | 110 |
| 5 | 2 | 47.7 | 0.4 | 40.5 | 120 |
| 6 | 3 | 47.3 | 0.2 | 42.0 | 114 |
| Control | Tego ® Dispers 740 W | 48.3 | 0.9 | 40.0 | 120 |

In evidence were the favorable development of tinctorial strength obtainable through the use of the dispersing additives of the invention and the favorable results of the rubout test in every case. In addition, this was particularly marked in comparison to the commercial, noninventive fatty acid alkoxylate (Tego® Dispers 740 W, from Tego Chemie Service).

While the invention has been particularly shown and described with respect to preferred embodiments thereof, it will be understood by those skilled in the art that the foregoing and other changes in form and details may be made therein without departing form the spirit and scope of the invention.

Having thus described my invention, what I claim as new, and desire to secure by LETTERS PATENT is:

1. A paste of pigments or fillers in an aqueous medium, comprising at least one hydrophobically modified polyasparatic acid derivatives having a carboxylic acid content of at least 60 mol % or salt thereof and customary auxiliaries and additives.

2. The paste as claimed in claim 1, comprising copolymeric polyaspartic acid derivatives in which at least 75 mol % of the units consist of structural units of the general formulae (I) and (II)

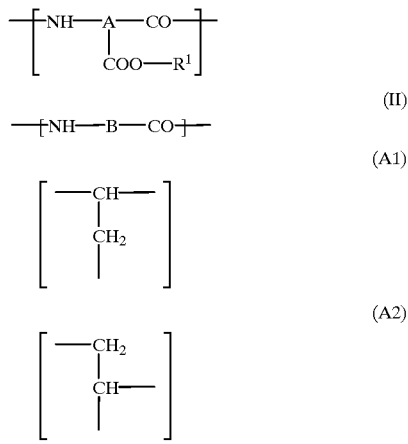

where A is a trifunctional hydrocarbon radical of 2 carbon atoms with the structure (A1) or (A2), a copolymer consisting of at least three units of the formula (I), in which $R^1$ has the definition of $R^2$, $R^3$ or $R^4$ where $R^2$ is one or more radicals from the group consisting of alkali metals, alkaline earth metals, hydrogen and ammonium, $[NR^5R^6R^7R^8]^+$, where $R^5$ to $R^8$ independently of one another are hydrogen, alkyl or alkenyl of 1 to 22 carbon atoms or hydroxyalkyl of 1 to 22 carbon atoms and 1 to 6 hydroxyl groups, $R^3$ is identical or different, straight-chain or branched, saturated or unsaturated alkyl or alkenyl radicals $R^9$ of 6 to 30 carbon atoms or is radicals of the structure —X—$R^9_1$ where X is an oligooxyalkylene or polyoxyalkylene chain of 1 to 100 oxyalkylene units, and $R^4$ is identical or different, straight-chain or branched, saturated or unsaturated alkyl or alkenyl radicals of 1 to 5 carbon atoms and at least one radical $R^1$ must adopt the definition of $R^2$ and at least one radical $R^1$ must adopt that of $R^3$ or $R^4$ and the units of the general formula (II) are proteinogenic or nonproteinogenic amino acids and are present in a proportion of not more than 20% by weight based on the copolymeric polyaspartic acid derivatives.

3. The paste as claimed in claim 2, wherein the radical $R^1$ has the definition of $R^3$.

4. The paste as claimed in claim 1, comprising surface-active copolymeric polyaspartic acid derivatives composed of aspartic acid units with free carboxyl and carboxylate radicals, of N-hydroxyalkyl-substituted aspartamide units and their acylation products with fatty acid derivatives.

5. The paste as claimed in claim 4, wherein said surface-active copolymeric polyaspartic acid derivatives are further composed of polysuccinimide units.

6. The paste as claimed in claim 1, comprising polyaspartic acid derivatives derived from the monoesters of α,β-unsaturated dicarboxylic acids and ammonia.

7. The paste as claimed in claim 6, wherein said nonvesters of α,β-unsaturated dicarboxylic acids are esters of maleic acids, fumaric acid, or their ammonium salts.

8. The paste as claimed in claim 1, wherein the polyaspartic acid derivatives have been neutralized with amines, amino alcohols, or mixtures thereof.

9. A method for preparing aqueous pigment pastes comprising dispersing titanium dioxide and carbon black with a dispersant, said dispersant comprising one or more hydrophobically modified polyaspartic acid derivatives or salts thereof.

10. A method of preparing aqueous pigment pastes comprising dispersing organic pigments with a dispersant, said dispersant comprising one or more hydrophobically modified polyaspartic acid derivatives or salts thereof.

11. The method as claimed in claim 10, wherein said organic pigment is phthalocyanine pigment.

* * * * *